United States Patent
Werner et al.

(10) Patent No.: US 12,489,283 B2
(45) Date of Patent: Dec. 2, 2025

(54) CABLE MANAGEMENT SYSTEM

(71) Applicant: Magpul Industries Corp., Austin, TX (US)

(72) Inventors: Michael Werner, Arvada, CO (US); Zachary Freeman, Westminster, CO (US); Cristopher McRae, Austin, TX (US)

(73) Assignee: Magpul Industries Corp., Austin, TX (US)

( * ) Notice: Subject to any disclaimer, the term of this patent is extended or adjusted under 35 U.S.C. 154(b) by 0 days.

(21) Appl. No.: 18/869,017

(22) PCT Filed: May 26, 2023

(86) PCT No.: PCT/US2023/023780
§ 371 (c)(1),
(2) Date: Nov. 25, 2024

(87) PCT Pub. No.: WO2023/230367
PCT Pub. Date: Nov. 30, 2023

(65) Prior Publication Data
US 2025/0167535 A1    May 22, 2025

Related U.S. Application Data

(60) Provisional application No. 63/346,580, filed on May 27, 2022.

(51) Int. Cl.
*H02G 3/32* (2006.01)
*F41G 11/00* (2006.01)
(Continued)

(52) U.S. Cl.
CPC ............... *H02G 3/32* (2013.01); *F41G 11/00* (2013.01); *G02B 6/46* (2013.01); *G02B 6/508* (2013.01)

(58) Field of Classification Search
CPC .. G02B 6/46; G02B 6/508; H02G 3/32; F41G 11/00
See application file for complete search history.

(56) References Cited

U.S. PATENT DOCUMENTS 6,443,403 B1    9/2002   Page et al.
8,875,434 B2 *  11/2014  Michal ................... F41C 23/22
                                                    42/96

(Continued)

FOREIGN PATENT DOCUMENTS

CN         102947604 B      12/2015
GB           2482189 A       1/2012
WO   WO-2008148748 A1 *    12/2008   ......... H01R 13/4362

OTHER PUBLICATIONS

PCT Patent Application No. PCT/US23/23780, filed May 26, 2023. International Search Report dated Sep. 11, 2023. 2 pages.

(Continued)

*Primary Examiner* — Daniel Petkovsek
(74) *Attorney, Agent, or Firm* — NOD Law PC

(57) ABSTRACT

A cable management device having a cap with cable channels and an aperture through which a plug is removably coupled to secure the cable management device into an accessory mounting slot. The cable channels can be open on a bottom of the device to accept one or more cables and capture them between the cable management device and a surface of the object with the accessory slots. The cable management device enables toolless installation, secured mounting in the absence of a cable, cable routing in multiple orientations and the ability to hold more than one cable at a time.

19 Claims, 21 Drawing Sheets

(51) Int. Cl.
*G02B 6/46* (2006.01)
*G02B 6/50* (2006.01)

(56) References Cited

U.S. PATENT DOCUMENTS

| | | | |
|---|---|---|---|
| 9,004,415 B2 * | 4/2015 | Fukumoto | F16B 19/1081 248/51 |
| 11,175,114 B1 | 11/2021 | Lee | |
| 2004/0144897 A1 * | 7/2004 | Maruyama | F16B 21/071 248/68.1 |
| 2015/0280334 A1 * | 10/2015 | McPheeters | H01R 4/34 439/573 |
| 2020/0143667 A1 | 5/2020 | Zimmer | |
| 2022/0373297 A1 | 11/2022 | Rosenbaum | |
| 2022/0408586 A1 | 12/2022 | Lee et al. | |

OTHER PUBLICATIONS

PCT Patent Application No. PCT/US23/23780, filed May 26, 2023. Written Opinion of the International Searching Authority dated Sep. 11, 2023. 5 pages.
European patent application No. 23812660.1, filed Dec. 27, 2024. Extended European Search Report dated Jul. 2, 2025. 4 pages.

* cited by examiner

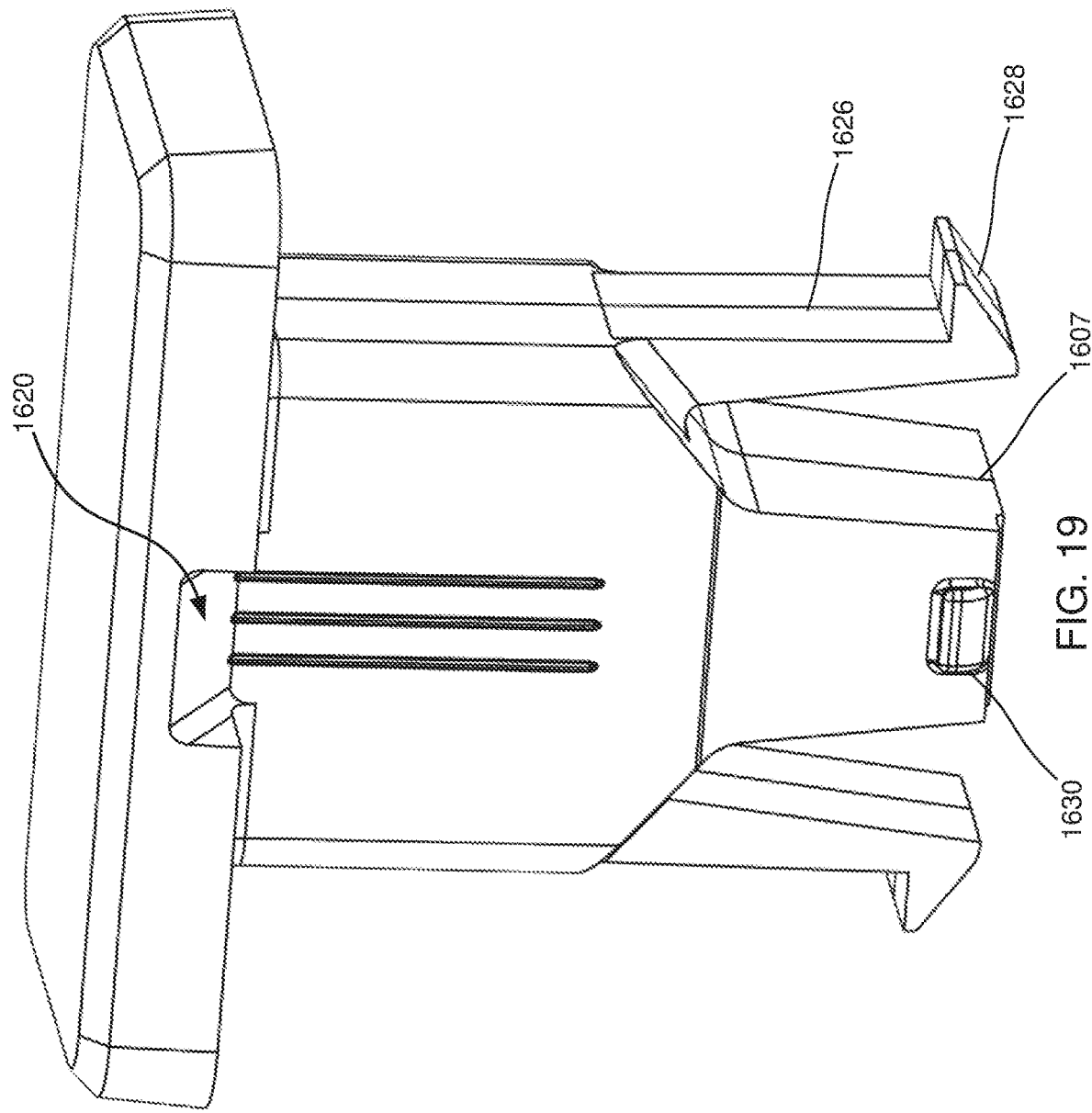

CABLE MANAGEMENT SYSTEM

CLAIM OF PRIORITY UNDER 35 U.S.C. § 119

The present Application for Patent is the United States National Phase of International PCT Patent Application No. PCT/US2023/023780, filed May 26, 2023, and published as WO 2023/230367 on Nov. 30, 2023, which claims priority to and the benefit of U.S. Provisional Patent Application No. 63/346,580 entitled "Cable Management System" filed May 27, 2022, both said applications are hereby incorporated by reference herein in their entirety.

FIELD OF THE DISCLOSURE

The present disclosure relates generally to cable management. In particular, but not by way of limitation, the present disclosure relates to cable management systems for firearm accessories.

DESCRIPTION OF RELATED ART

Modern firearm handguards typically accommodate accessories such as tactical lights and lasers which are often used with cabled pressure switches. Traditional methods for securing the otherwise loose cables of these accessories have included do-it-yourself (DIY) options such as tape, zip ties, rerouting the cables on themselves, or guiding cables through cooling slots on the firearm handguard. Each method has substantial deficiencies regarding the security and integrity of the cables. Thus, specialized products were developed to counter some of these deficiencies.

SUMMARY OF THE DISCLOSURE

However, existing products fail to provide a solution integrating the following features: a toolless installation, secured mounting in the absence of a cable, a cable routing in multiple orientations and the ability to secure one or more cables at once. Therefore, there is a need to combine the features above into an aesthetic, compact, lightweight and modular cable management system that overcomes the challenges of existing cable management devices.

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

As noted above, current cable management systems for managing otherwise loose cables on modern firearms suffer deficiencies, especially with regards to ease of use, durability, and effectiveness, to name a few. Aspects of the present disclosure are generally directed to a cable management system comprising a cap with locking members and a plug with a tapered profile, wherein the plug is manipulated by a user into the cap thereby expanding the locking members. The locking members comprising rigid, outboard-facing engaging members configured to engage a side of a firearm handguard and further configured to prevent inadvertent removal of the cable management system from the firearm handguard; wherein the plug further comprises crush-ribs oriented above the tapered profile and configured to prevent slop between the cap and the plug.

In one aspect, the user, by press-fitting the plug into the cap, engages the crush-ribs of the plug to permit the cable management system to maintain its attachment to the firearm handguard without a cable installed.

In one aspect, the plug and the cap have slotted features that accommodate a bullet tip or simple tool for removal of the cable management system.

In one aspect, the cap incases a cable when fully assembled.

In one aspect, the inner profile of the cap is rectangular in shape with rounded edges, allowing for 90-degree routing angles.

In one aspect, the outer profile of the cap has four openings on each corner, allowing for the cable to route in multiple orientations.

In another aspect, the cap profile allows more than one cable to be routed simultaneously.

In yet another aspect of the present disclosure, the cable management assembly may comprise no metallic hardware, thereby reducing the cable management assembly's weight burden.

In some aspects, the techniques described herein relate to a cable management system including: a cable management device including: a means for removably coupling the cable management device to a slot; two or more cable channels on a bottom side thereof; an aperture; and a first plug slidingly engaged in the aperture, wherein full insertion of the first plug into the aperture causes the means for removably coupling the cable management device to the slot, secures the cable management device at a selected location along the slot; a first cable secured within one of the two or more channels when the first plug is fully inserted into the aperture.

In some aspects, the techniques described herein relate to a cable management system, wherein the first plug includes two snap latches configured to keep the first plug coupled to the cable management device when the cable management device is not inserted in the slot or while in a pre-fit state.

In some aspects, the techniques described herein relate to a cable management system, wherein the first plug further includes a nub near a bottom that, via contact with one of two locking members of the cap, prevents the first plug from inadvertently being removed from the cap while in a fully-inserted state.

In some aspects, the techniques described herein relate to a cable management system, wherein the two or more channels intersect.

In some aspects, the techniques described herein relate to a cable management system, wherein the means for removably coupling the cable management device to a slot includes two locking members configured to deflect inward when the cap is inserted into the slot, and to return to a default position once engaging members of the locking members clear the slot.

In some aspects, the techniques described herein relate to a cable management system, wherein a tapered region of the first plug is shaped to press the locking members outward and enhance securement of the cable management system at a selected location along the slot.

In some aspects, the techniques described herein relate to a cable management system, wherein the slot is part of a firearm.

In some aspects, the techniques described herein relate to a cable management system, wherein the slot is part of a firearm forend.

In some aspects, the techniques described herein relate to a cable management system, wherein the cap includes two locking members extending down from a bottom of the cap and configured to snap fit into the slot.

In some aspects, the techniques described herein relate to a cable management system, further including a second plug arranged next to the first plug.

In some aspects, the techniques described herein relate to a cable management system, further including two additional locking members corresponding to the second plug.

In some aspects, the techniques described herein relate to a cable management system, wherein there are four cable channels, each intersecting with two others of the four cable channels.

In some aspects, the techniques described herein relate to a device including: a cap including: an aperture; at least two cable channels open on a bottom of the cap to accept one or more cables; and two locking members forming sides of the aperture and extending below a bottom of the at least two cable channels, the locking members configured to couple to an object via a slot in the object; and a plug removably engaged in the aperture and configured to cause outward deflection of the two locking members when the plug is fully inserted into the aperture thereby securing the device at a selected location along the slot.

In some aspects, the techniques described herein relate to a device, wherein the plug includes two snap latches that prevent the plug from inadvertently being removed from the cap while in a pre-fit state.

In some aspects, the techniques described herein relate to a device, wherein the plug further includes a nub near a bottom that, via contact with one of the two locking members of the cap, prevents the plug from inadvertently being removed from the cap while the cap is in a fully-inserted state.

In some aspects, the techniques described herein relate to a device, further including two locking members forming part of the aperture, wherein the locking members are configured to deflect inward when the cap is inserted into the slot, and to return to a default position once engaging members of the locking members clear the slot.

In some aspects, the techniques described herein relate to a device, wherein a tapered region of the plug is shaped to press the locking members outward and enhance securement of the device to the object.

In some aspects, the techniques described herein relate to a method of routing cables including: inserting locking members of a cap of a cable management device into an accessory interface slot; capturing a cable in one of one or more cable channels on an underside of the cap; adjusting a position of the cable management device along the accessory interface slot; and pressing a plug into the aperture to secure the position of the cable management device along the accessory interface slot as well as a position of the cable along the accessory interface slot.

In some aspects, the techniques described herein relate to a method, further including, partially removing the plug from the aperture in the cap and sliding the cable management device to another location on the accessory interface slot.

In some aspects, the techniques described herein relate to a method, further including, after removing the plug to at least a pre-fit state, moving the cable management device along the accessory interface slot or removing the cable management device sufficiently from a surface of the accessory interface to remove the cable from the one or more cable channels.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 19 illustrates an isolated view of the plug from the embodiment first seen in FIG. 15;

DETAILED DESCRIPTION

Prior to describing the embodiments in detail, it is expedient to define terms as used in this document. For the purpose of this document, relational terms such as, without limitation, "lateral", "longitudinal", "perpendicular", "parallel", and "flat" shall be understood to mean "within reasonable manufacturing tolerances accepted in the firearms and consumers products manufacturing industries".

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the functionality and operation of possible implementations of a cable management device according to various embodiments of the present disclosure. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

The present disclosure relates generally to cable management. In particular, but not by way of limitation, the present disclosure relates to cable management systems for firearm accessories.

Figure 1:
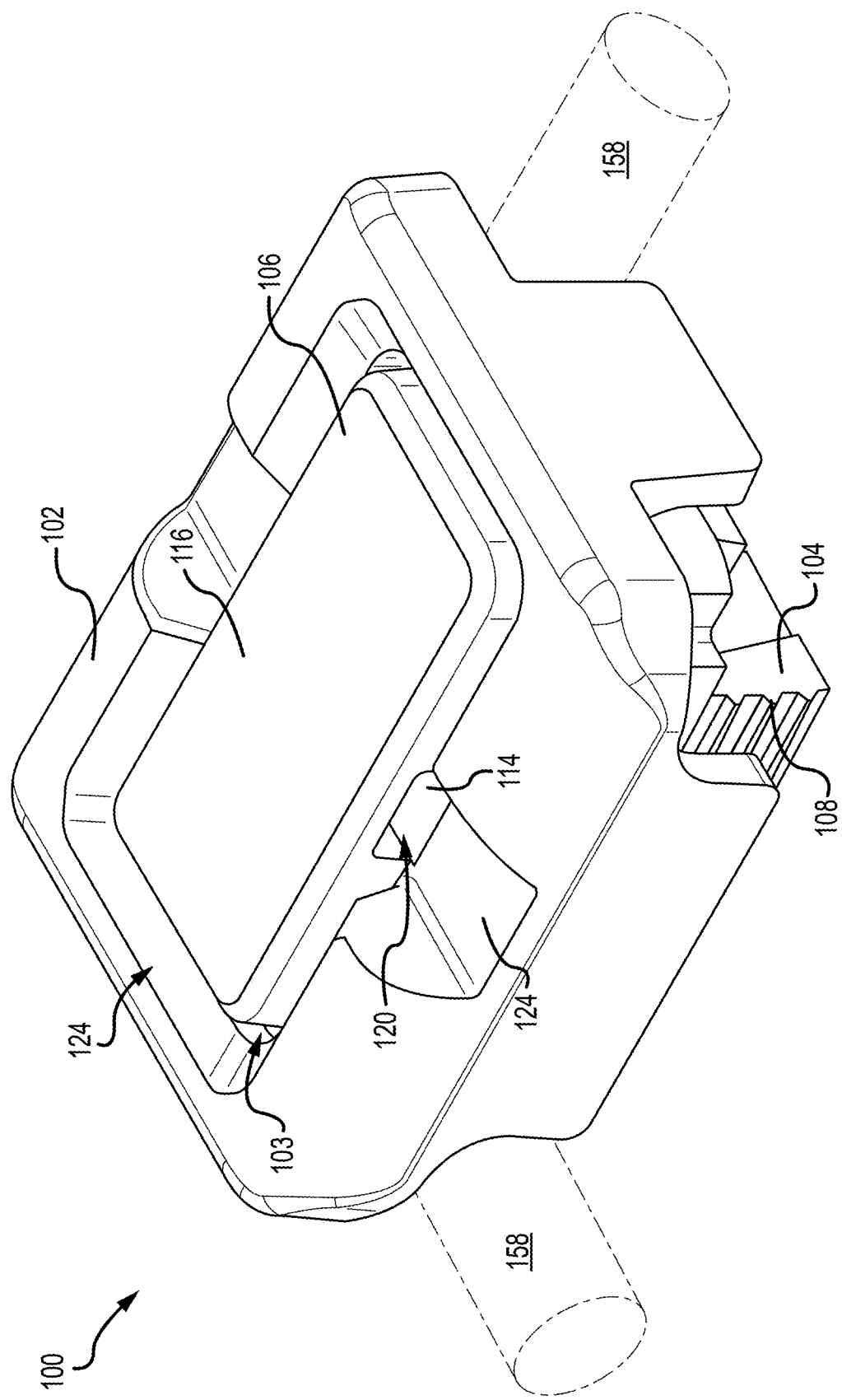
FIG. 1 is a perspective view of the cable management system, according to various aspects of the disclosure.

FIG. 1 illustrates a top perspective view of a cable management system, according to various aspects of the present disclosure. The cable management system 100 comprises a cap 102 with an aperture 103 (see FIG. 9) therein, and a plug 106 configured to slidingly engage with and to pass at least partially through the aperture 103. The cap 102 further comprises two locking members 104 capable of deflecting inward toward each other when the cap 102 is inserted into an M-LOK slot or other shaped accessory mounting interface. The locking members 104 may be shaped and manufactured to reduce or prevent inadvertent removal or detachment of the cable management system 100. In a default state or resting state, the locking members 104 have one or more engaging members 108, such as a horizontal ridge and/or valley, that are slightly wider than a width of an M-LOK slot (see FIG. 5). This allows the engaging members 108 of the locking members 104 to provide a securing action when the cap 102 is fully inserted into an M-LOK slot (a fully-inserted state), however this securing action is enhanced when the plug 106 is fully inserted into the cap 102 (after the cap 102 is inserted into the M-LOK slot). A tapered region 107 of the plug 106 can be arranged such that it presses against inner sides of the locking members 104 when the plug 106 is fully inserted into the cap 102. In some embodiments, the tapered region 107 can taper inward from top to bottom when viewed from the front (see FIG. 11) and side (see FIG. 10). The tapered region 107 may extend about one quarter, or one third, or one half of a way from a bottom to a top of the plug 106. Accordingly, the cap 102 cannot be inserted into an M-LOK slot or similar slot when the plug 106 is fully inserted since the locking members 104 are unable to deflect inward and allow the locking members 104 to pass through the M-LOK slot. Instead, the cap 102 is to be inserted into an M-LOK slot with the plug 106 either removed or only partially inserted into the aperture 103 (see FIG. 4), in this way allowing the locking members 104 to deflect inward as they contact and pass through the M-LOK slot. Once clear, the locking members 104 can expand to their resting state and the engaging members 108 can extend beyond a width of the M-LOK slot to prevent inadvertent removal of the cap 102 from the M-LOK slot. With the cap 102 inserted, but the plug 106 partially inserted, a loose securement exists that allows the cable management system 100 to be easily moved along an M-LOK slot, to better position the cable management system 100 before final securement. When a final location along the slot is selected, the plug 106 can be inserted into the cap 102 or pressed fully into the cap 102, if it was previously partially inserted, thereby preventing the locking members 104 from deflecting inward and hence more fully securing the cable management system 100 in the M-LOK slot. This transition from partial insertion to full insertion of the plug is best seen starting with FIG. 4 and moving to FIG. 5. Not only does full insertion of the plug 106 cause the engaging members 108 to extend under the sides of the slot as seen in FIG. 5, but it may also press sides of the cap 106 outward to press against inner sides of the slot, thereby further enhancing securement of the cable management system 100. In some embodiments, the engaging members 108 extend beyond a width of the M-LOK slot in the default or resting state, while in other embodiments, both the locking members 104 and the engaging members 108 extend beyond a width of the M-LOK slot in the default or resting state. In this way, the cable management system 1600 can be retained in the slot with or without a cable being held therein (whereas many prior art designs require a cable in order to achieve a tight engagement with the slot).

The cap 102 includes a plug recess 124 having slightly larger length and width than the plug 106 such that the plug 106 can nest in the plug recess 124 leaving a flush top surface of the cable management system 100.

The cap 102 can include two or more cable channels and in this particular implementation includes a first cable channel 150, a second cable channel 152, a third cable channel, and a fourth cable channel 156 for securing and guiding cables 158, though as few as one cable channels and as many as size will allow, may be implemented in other embodiments. Often, powered accessories have universal cables that are not tailored to a user's application and a user may use cable ties and other mechanisms to organize, guide, and hold down loose and extra cable, such as that stretching between a laser sight or flashlight and a battery pack or other accessory on a firearm forend. The herein disclosed cable management system 100 allows such cables to be routed in various directions through the first cable channel 150 and/or the first cable channel 156. First and second cable channels 150 and 152 are provided in parallel to each other, and third and fourth cable channels 154 and 156 are provided in parallel to each other, while the first and second cable channels 150 and 152 are provided at right angles to the third and fourth cable channels 154 and 156. In other words, the first cable channel 150 intersects with the third and fourth cable channels 154 and 156, and the second cable channel 152 intersects with the third and fourth cable channels 154 and 156. The cable channels 150, 152, 154, 156 are open on a bottom of the cap to allow the cable 158 to be inserted and snapped into one or more of the channels 150, 152, 154, 156 before the cap 102 is pressed down and locked into place.

Returning to FIG. 1, the plug 106 may include one or two removal apertures 120 shaped to accept the end of a bullet or other narrow-ended tool used to pry the plug 106 from the cap 102. Corresponding one or two slots 124 can be arranged in the cap 102 to more easily allow access to the removal apertures 120.

The plug 106 may include one or more crush-ribs 114 (see FIG. 9) or similar structures that enhance the friction fit with the plug 106 and aperture 103, which reduces slop between the cap 102 and the plug 106.

In some embodiments the plug 106 may comprise variable profiles and may be arranged within the cap 102 by means other than those represented above. In some embodiments, the cap 102 and the plug 106 may be composed of the same or similar material.

Figure 20A:
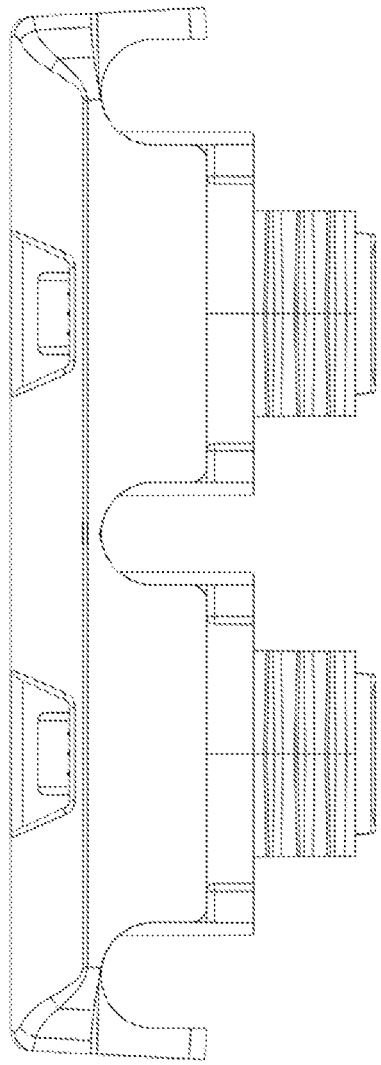
FIG. 20A shows an example of a side view of a multi-plug embodiment having two plugs and 5 cable channels.
Figure 20B:
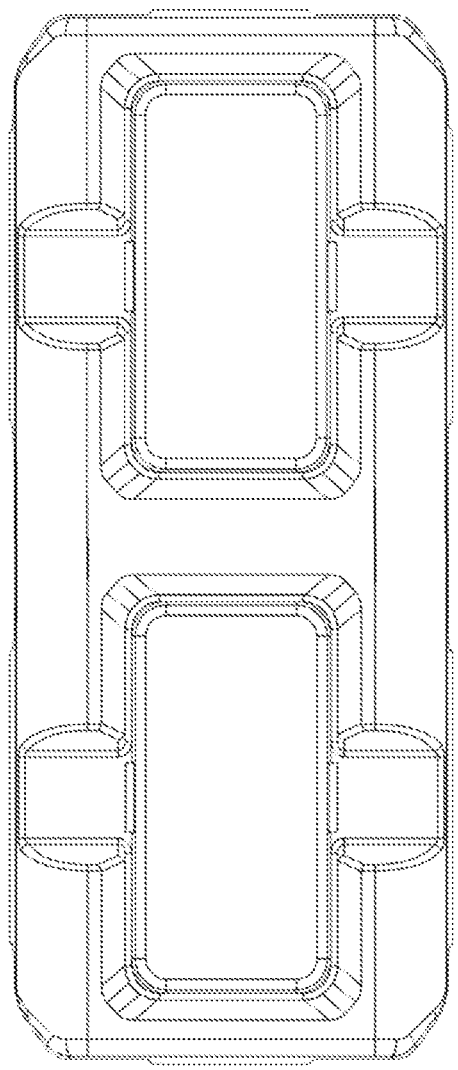
FIG. 20B shows an example of a top view of the multi-plug embodiment of FIG. 20A.

Although the illustrated cable management system 100 has a single plug 106, in other embodiments, two or more plugs may be implemented as part of a longer device that may couple with two or more M-LOK slots. Where multiple plugs are implemented, there may also be a correspondingly greater number of cable channels (e.g., 5 for a two-slot device and 7 for a three-slot device). FIGS. 20A and 20B show an example of a side and top view of a multi-plug embodiment having two plugs and 5 cable channels. The two plugs are arranged adjacent to each other along a longitudinal axis of the multi-prong cable management system 100. There being two plugs, there are therefore four locking members in this embodiment.

Figure 13:
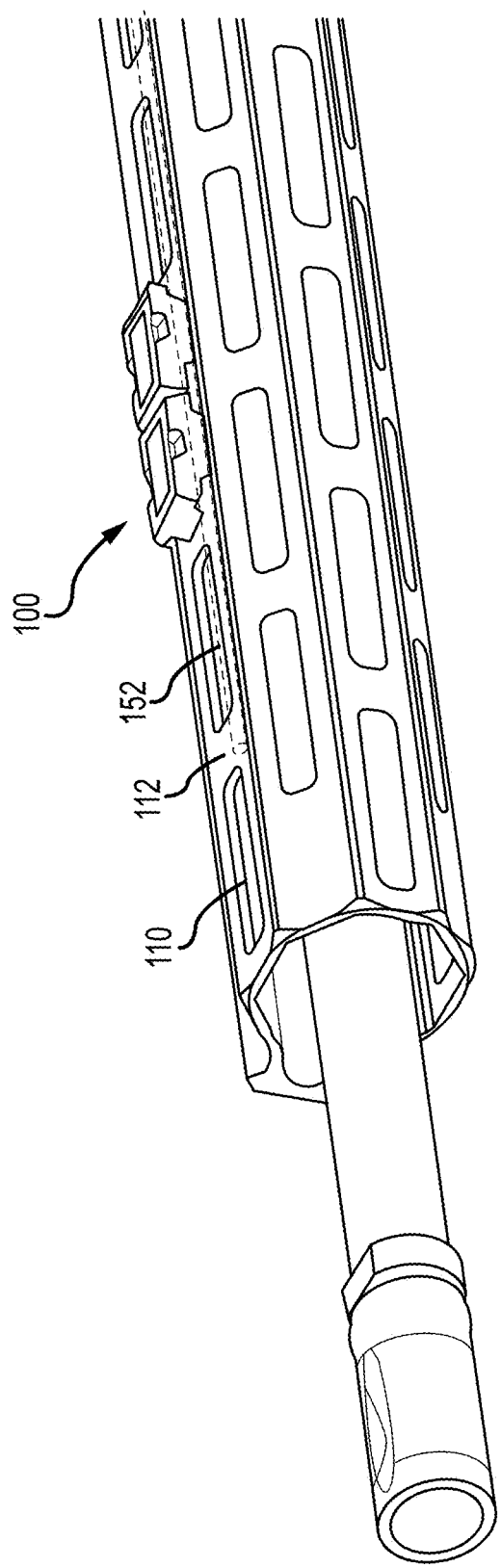
FIG. 13 illustrates a perspective view of two cable management systems engaged with the same side of firearm forend (i.e., on the same rail), according to various aspects of the disclosure.

The cap 102 includes cable channels 152, 154, 156, 158 that pass under and along peripheries of the cap 102, two in both directions, and each pair of channels 152, 154 and 156, 158, are perpendicularly arranged relative to the other. When arranged on a firearm, for instance, this allows cable routing parallel to the barrel as well as in a circumferential direction around the barrel (e.g., see FIGS. 13 and 14). FIGS. 1, 2, 4, and 5 show possible cable 158 locations in the cable management system 100, though many other variations are possible. The cable channels 152, 154, 156, 158 are arranged such that the cable 158 can be guided at 90° angles (see FIG. 1) or in straight orientations (see 13 and 14). In other embodiments, multiple cable management systems 100 can be spaced by one or more M-LOK slots and/or can be arranged on different accessory rails, such as a top and side rail, to allow different routings of cables along a device having M-LOK slots. For instance, FIG. 13 shows how a curved cable path between two M-LOK rails in different planes can be formed.

The depth of the cable channels 150 is selected to pinch the cable(s) 158 against a surface 160 of the accessory rail or firearm and thereby prevent movement of the cable(s) 158 once the plug 106 is inserted into the cap 102. Along these same lines, the one or more locking members 104 may be shaped to pull the cap 102 against the surface 160 of the accessory rail or firearm when the plug 106 is inserted into the cap 102. Although the channels 150 are shown as having a similar radius to the cable(s) 158, in other embodiments, the cable channels 150 could be slightly smaller than a radius of the cable(s) 158 to further secure the cable(s) 158 in a desired location, though this variation would also make installation more challenging than merely relying on a pinching force between a top of the channels 150 and the surface 158.

As depicted, the cap's 102 profile may be configured to permit 90° routing angles for cables (not shown) within the cable management system 100. Moreover, the cap's 102 profile may be configured to permit two or more cables to be routed simultaneously.

Figure 2:
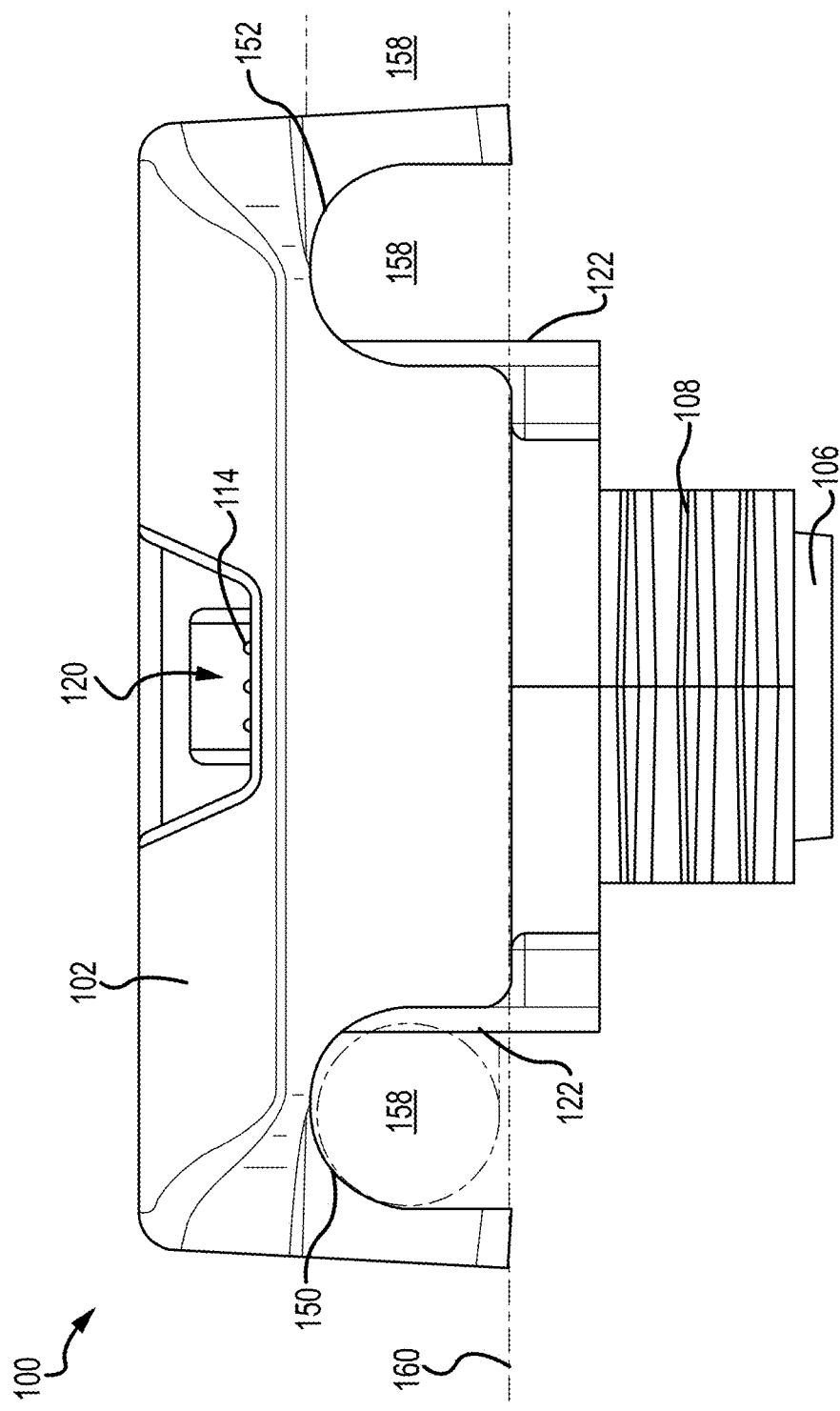
FIG. 2 illustrates a side elevation view of the cable management system with a cable, according to various aspects of the disclosure.

FIG. 2 illustrates a right-side view of the cable management system 100, according to various aspects of the disclosure.

Figure 3:
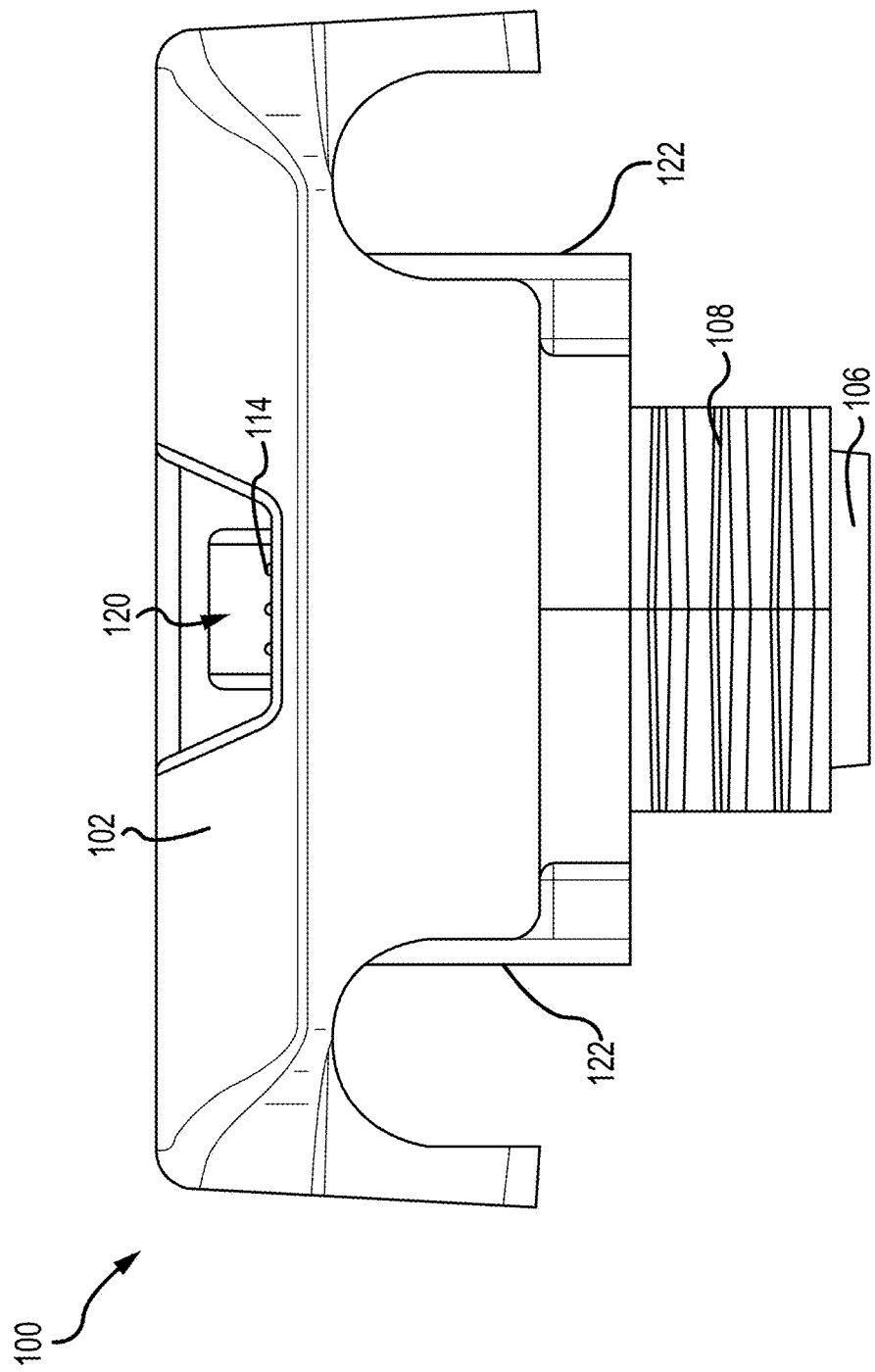
FIG. 3 illustrates a side elevation view of the cable management system without a cable, according to various aspects of the disclosure.

FIG. 3 illustrates a left-side view of the cable management system 100, according to various aspects of the disclosure.

Figure 4:
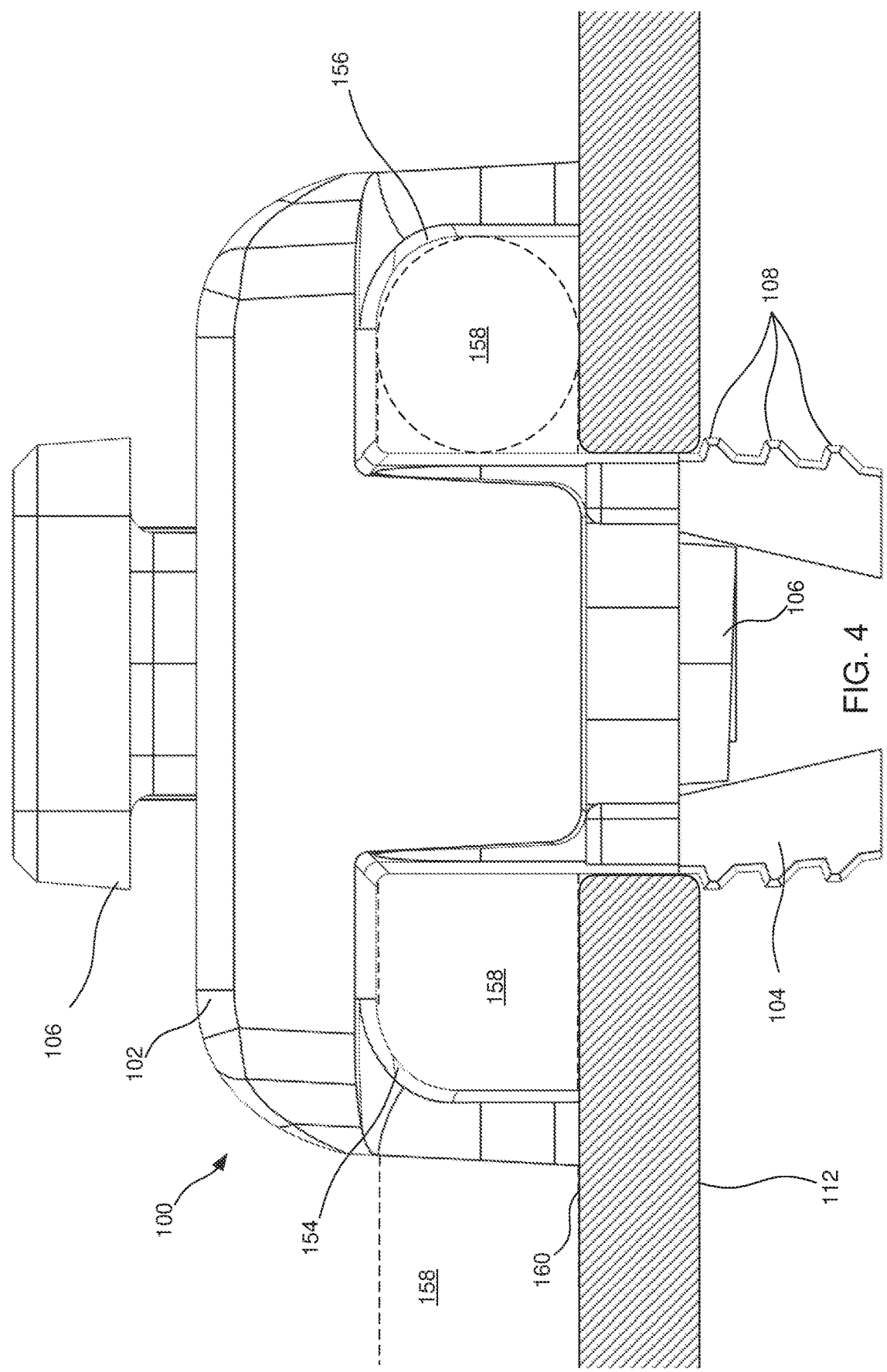
FIG. 4 illustrates a front elevation view of the cable management system with the plug in a pre-fit state, according to various aspects of the disclosure.
Figure 5:
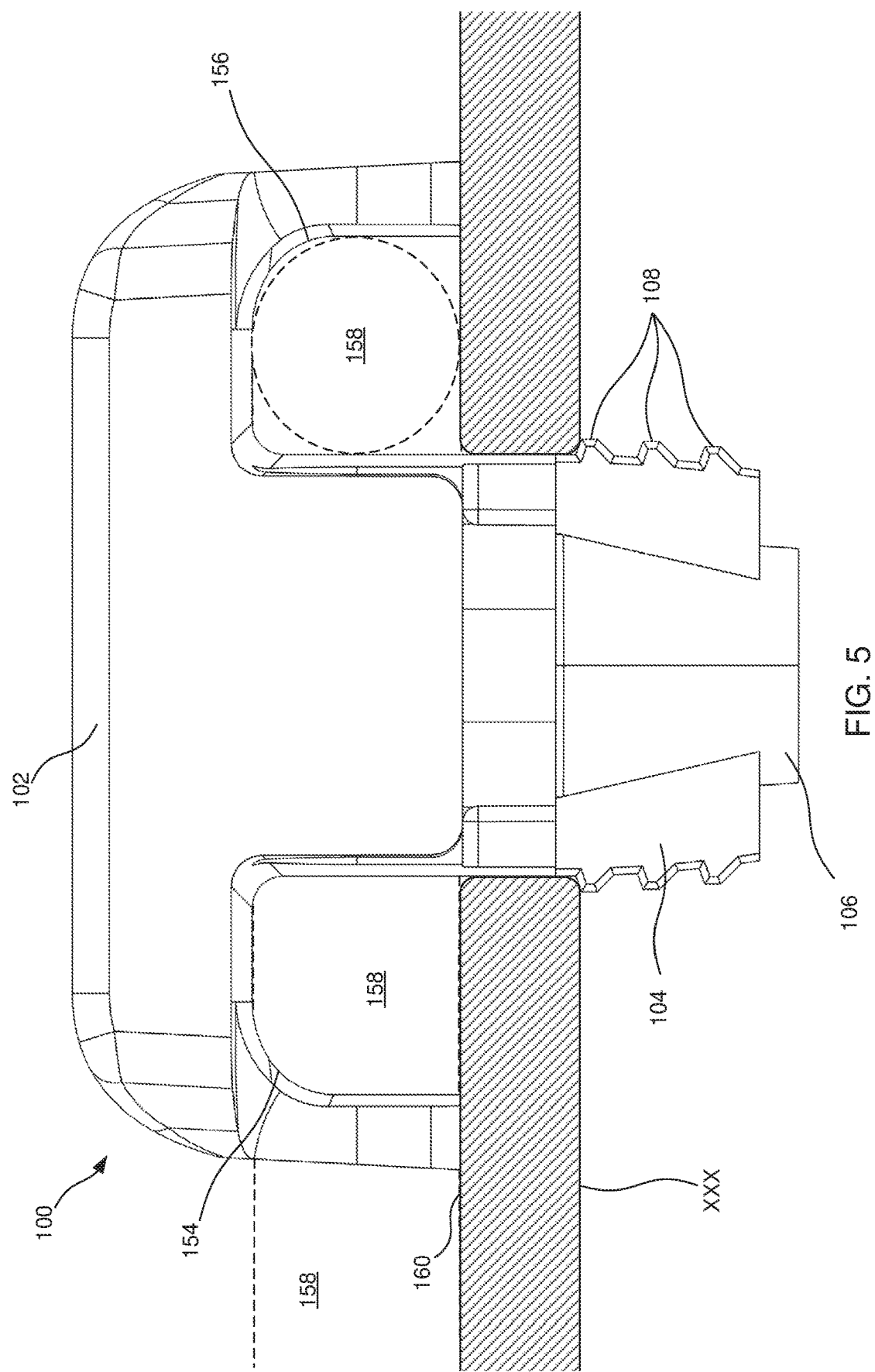
FIG. 5 illustrates a front elevation view of the cable management system with the plug fully inserted into the cap, according to various aspects of the disclosure.

FIG. 4 illustrates a front view of the cable management system 100, according to various aspects of the disclosure.

FIG. 5 illustrates a rear view of the cable management system 100, according to various aspects of the disclosure.

Figure 6:
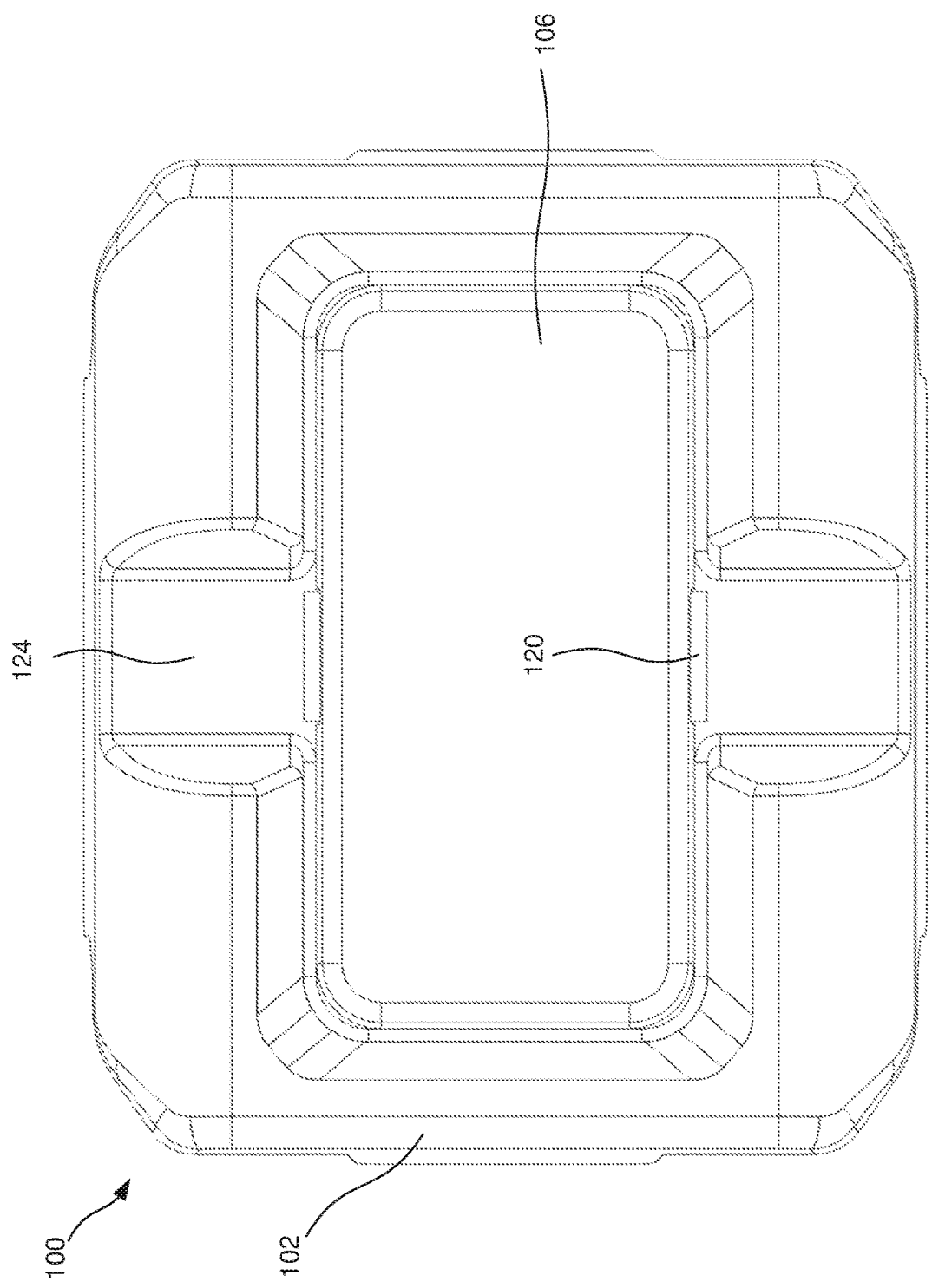
FIG. 6 illustrates top view of the cable management system, according to various aspects of the disclosure.

FIG. 6 illustrates a top view of the cable management system 100, according to various aspects of the disclosure.

Figure 7:
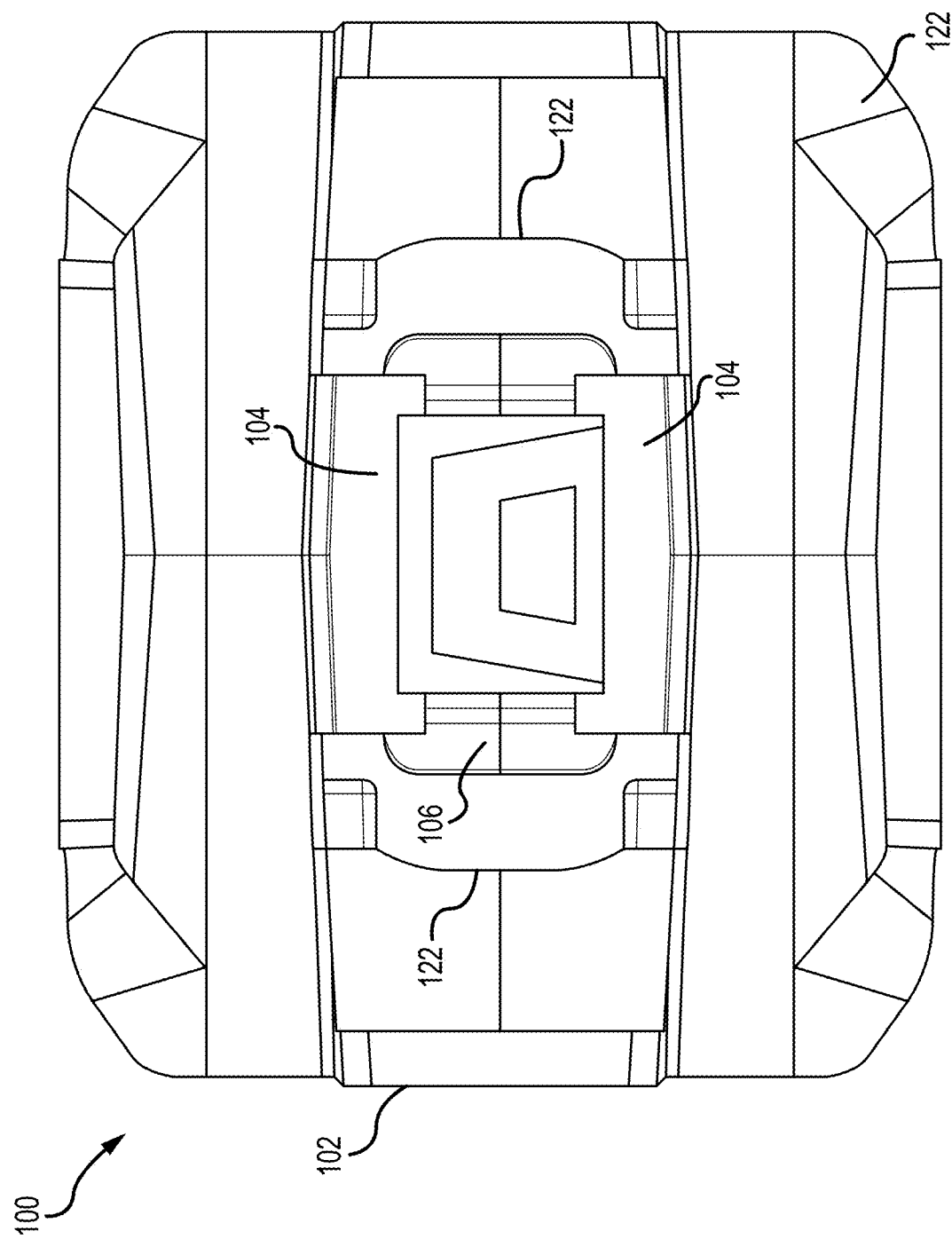
FIG. 7 illustrates bottom view of the cable management system, according to various aspects of the disclosure.

FIG. 7 illustrates bottom view of the cable management system 100, according to various aspects of the disclosure.

Figure 8:
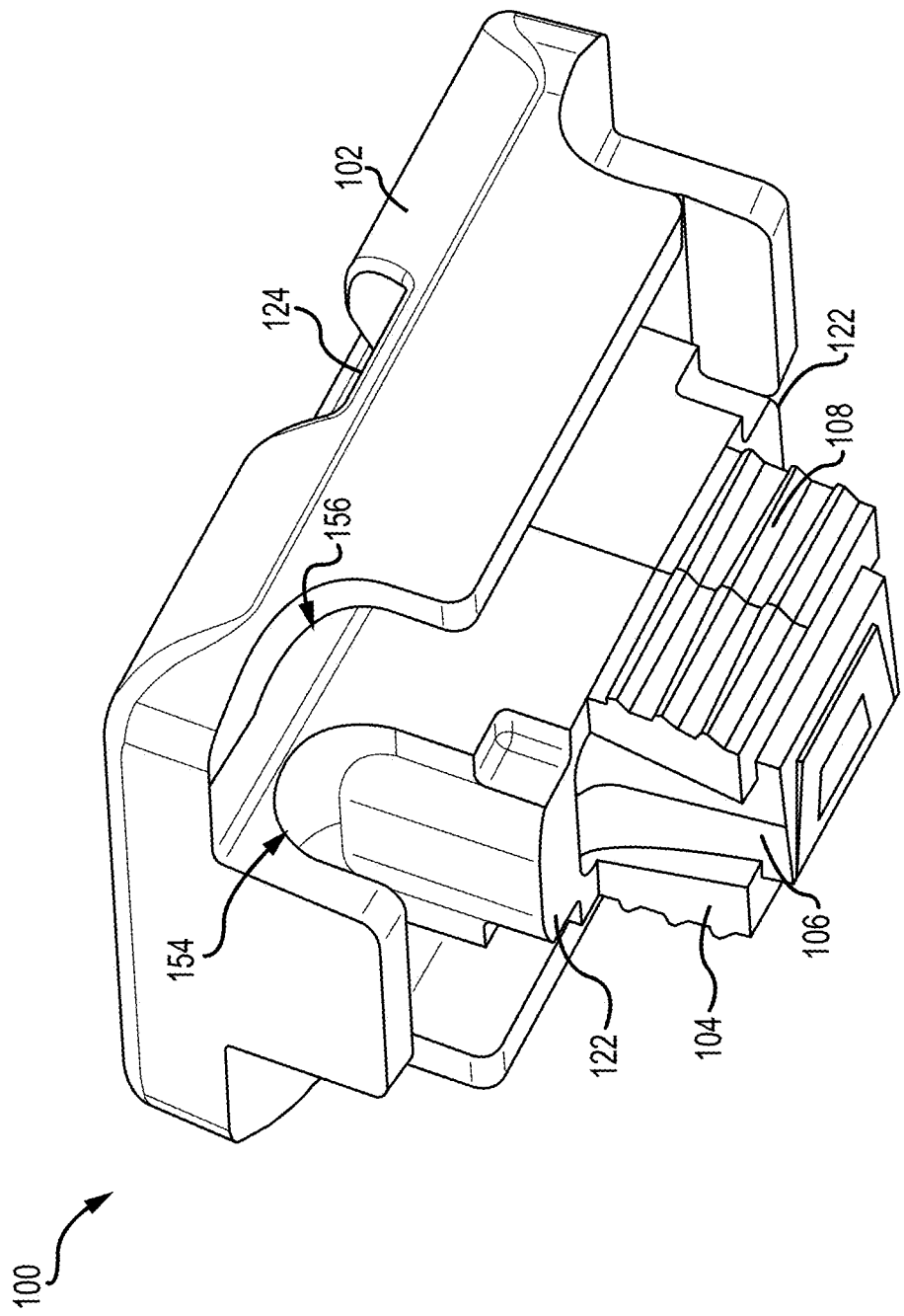
FIG. 8 illustrates a bottom perspective view of the cable management system, according to various aspects of the disclosure.

FIG. 8 illustrates a bottom perspective view of the cable management system 100, according to various aspects of the disclosure. The pinching block 122 can be seen within the first cable channel 150, which helps to secure a cable when inserted into the first cable channel 150. A portion of a pinching block 122 in the second cable channel 152 is also visible.

Figure 9:
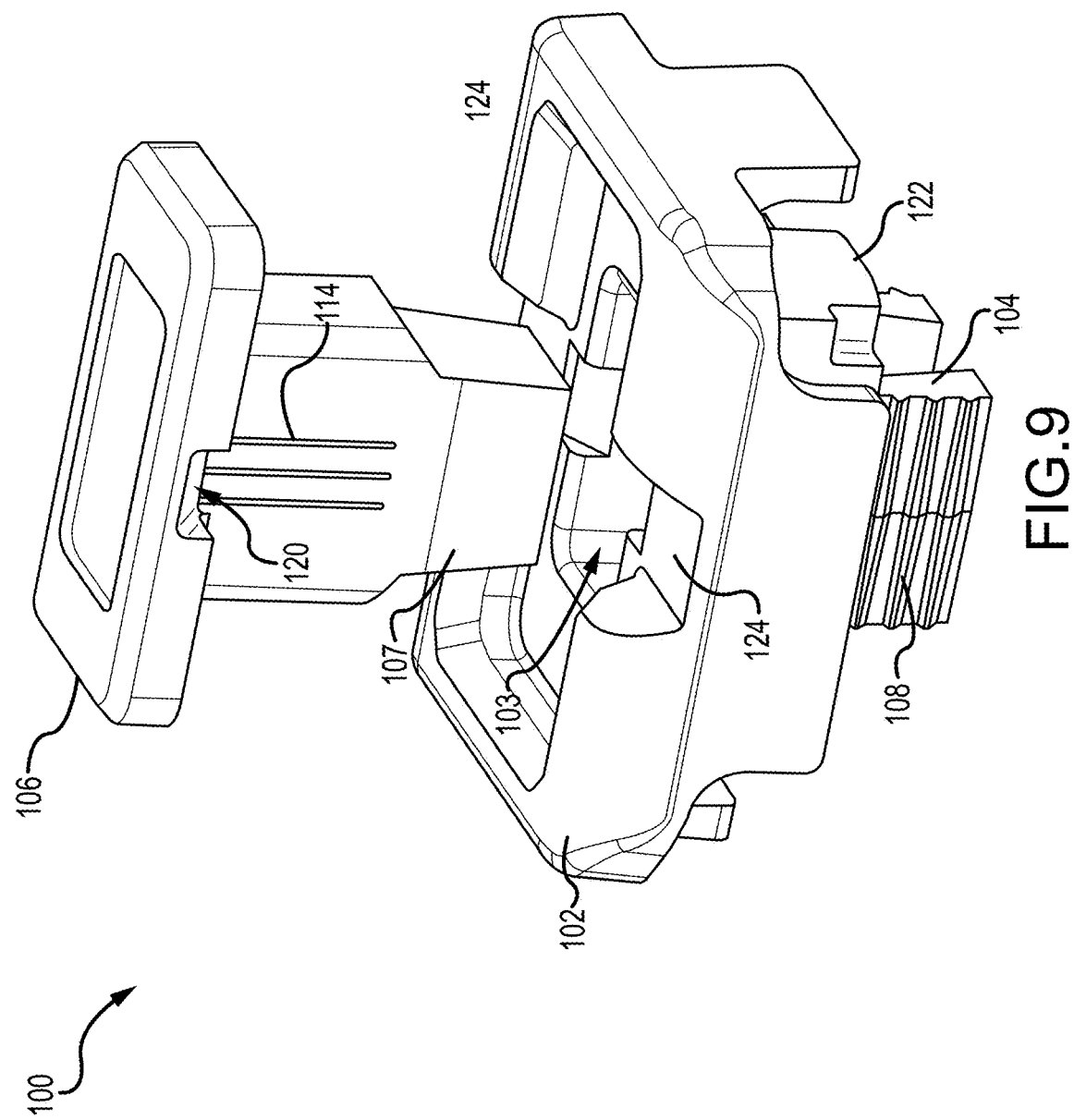
FIG. 9 illustrates another perspective view of the cable management system wherein the plug is separate from the cap, according to various aspects of the disclosure.

FIG. 9 illustrates another perspective view of the cable management system 100, according to various aspects of the disclosure, wherein the plug 106 is separated from the cap 102. As seen, the cap aperture 103 is centrally positioned within the cap 102 and the locking members are in a disengaged position.

Figure 10:
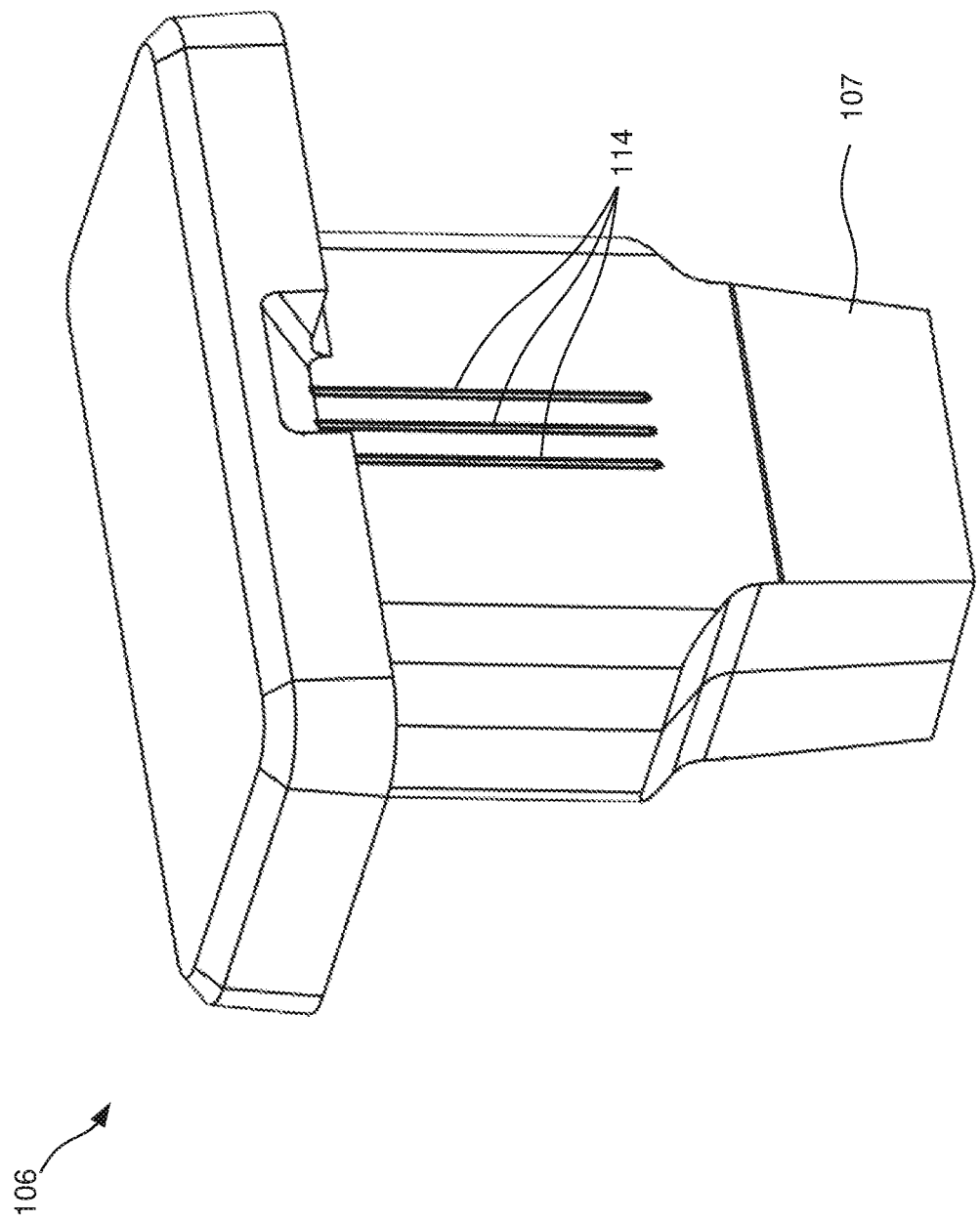
FIG. 10 illustrates a perspective view of a plug, according to various aspects of the disclosure.

FIG. 10 illustrates a perspective view of a plug 106, according to various aspects of the disclosure. As seen, the plug 106 comprises a tapered region 107, and crush-ribs 114.

Figure 11:
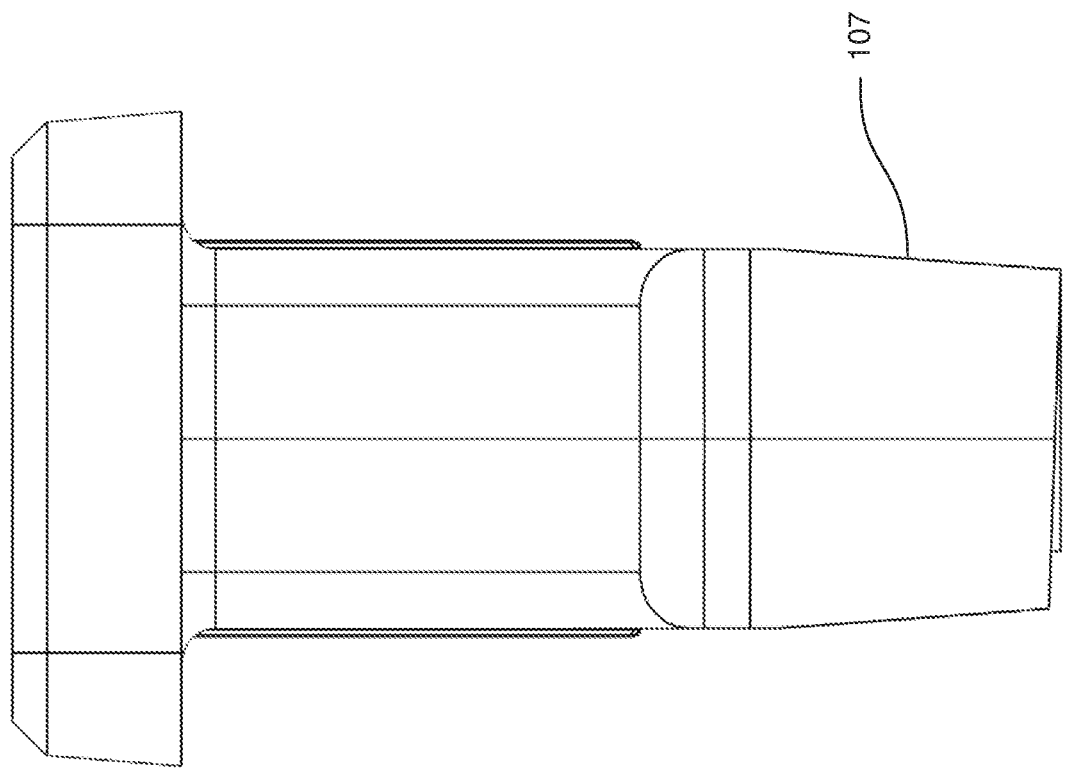
FIG. 11 illustrates an elevation view of a plug, according to various aspects of the disclosure.

FIG. 11 illustrates an elevation view of a plug 106, according to various aspects of the disclosure.

Figure 12:
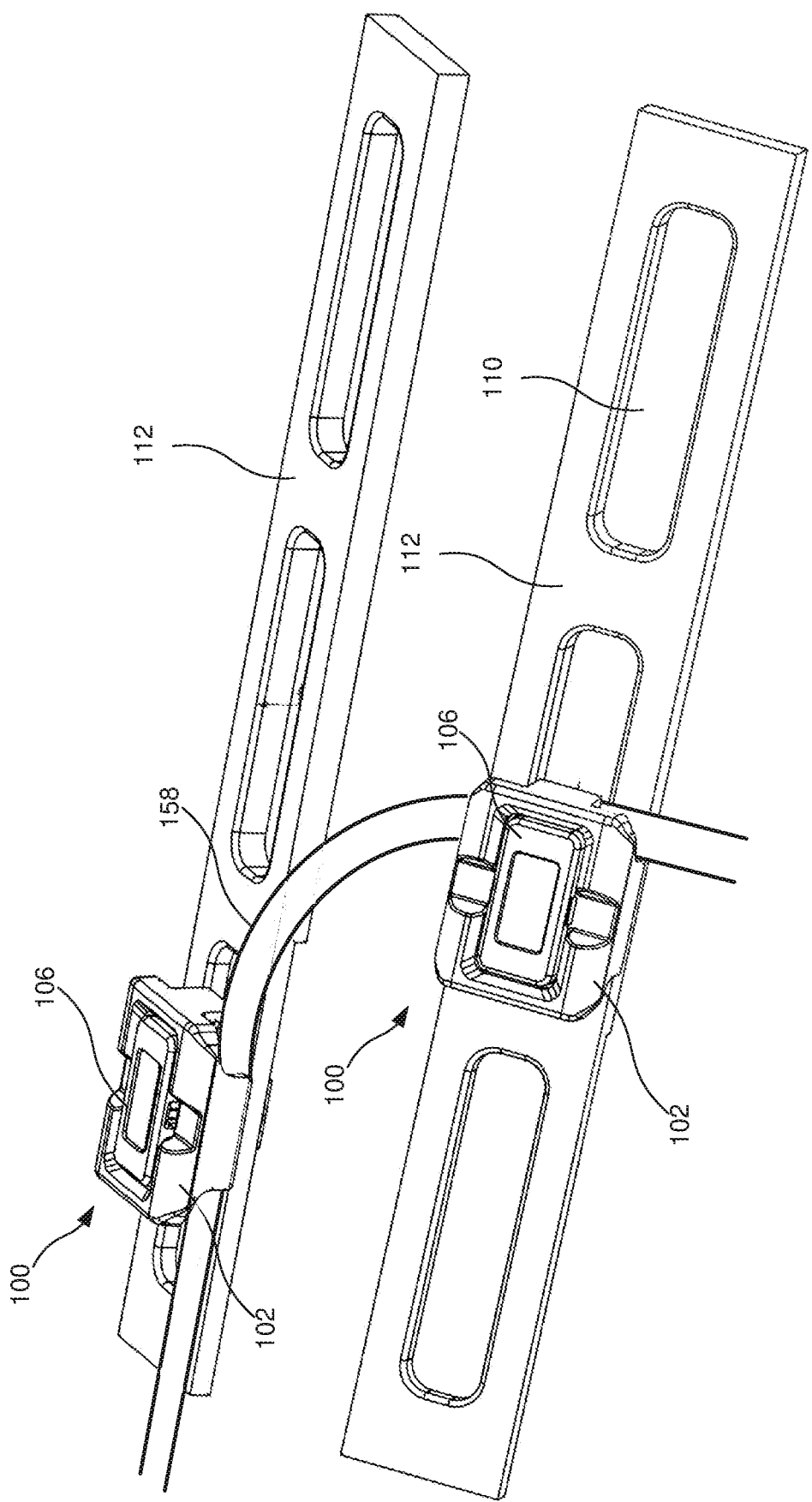
FIG. 12 illustrates an embodiment of two cable management systems used in concert to direct a cable along two accessory rails such as seen on many firearm handguards (only two rails are shown as the rest of the handguard and firearm are hidden).

FIG. 12 illustrates an embodiment of two cable management systems 100 used in concert to direct a cable 158 along an accessory rail 112 such as seen on many firearm handguards (only two rails are shown as the rest of the handguard and firearm are hidden). The accessory rails 112 include a number of elongated slots 110 that the cable management systems 100 engage with. In this variation, the two cable management systems 100 are arranged on distinct sides of the accessory rail 112, which may be hexagonal or octagonal, and the cable 158 is guided through perpendicular channels of the cable management systems 100 to allow the cable 158 running parallel to the barrel to curve and be securely guided in a circumferential direction around the accessory rail 112.

FIG. 13 illustrates a perspective view of two cable management systems 100 engaged with a same side of an accessory rail 112 of the firearm handguard (i.e., on the same rail), according to various aspects of the disclosure. As seen, the cable management systems 100 can be aligned on a single rail to guide a cable in a single direction over longer distances. Also note that the plug 106 is flush with a top of the cap 102 such that the cable management system 100 when installed can act as a rail cover, especially where multiple cable management systems 100 are deployed in proximity to each other.

Figure 14:
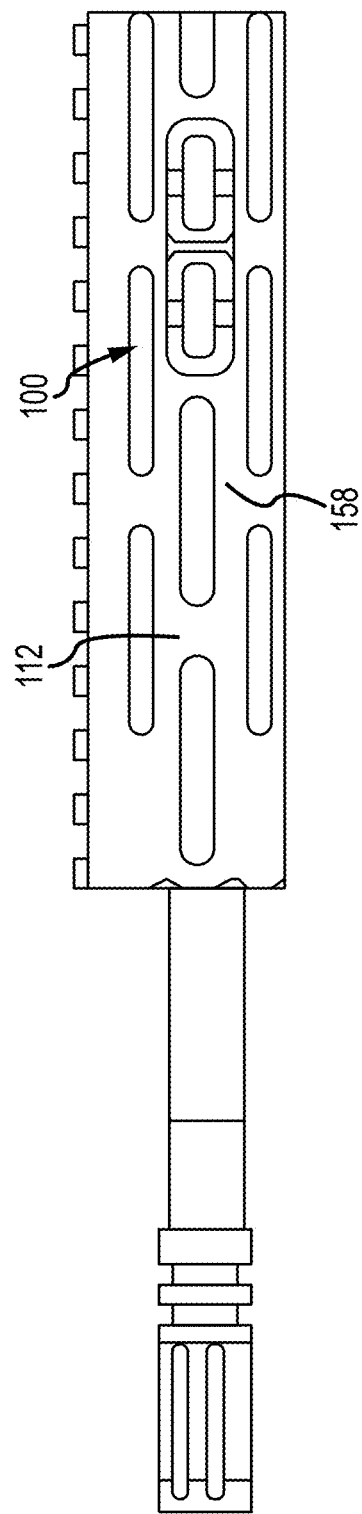
FIG. 14 illustrates a side view of a firearm forend using two cable management systems to guide a cable along the forend.

FIG. 14 illustrates a side view of a firearm forend using two cable management systems 100 to guide a cable along the forend.

FIGS. 15-19 illustrate an alternative embodiment of a cable management system where the plug includes feet enabling two positions for the plug in the cap where the two do not need to be detached when the cable management system is not coupled to an accessory interface such as M-LOK. The cable management system 1600 has a pre-fit stage, shown in FIGS. 15 and 16, and an installed stage, shown in FIGS. 17 and 18. In the pre-fit stage, as the product may appear when purchased, the plug 1606 has two snap latches 1626 on either of the short ends of the plug 1606, and these snap latches 1626 can be flexible such that they can be deflected inward, somewhat like the locking members 1604 can be deflected inward. During factory assembly the plug 1606 can be inserted into the cap 1602, and the snap latches 1626 can be deflected inward to allow the tapered region 1607 of the plug 1606 to pass through the aperture 1603 in the cap 1602. Once feet 1628 clear a bottom of the aperture, and in particular the pinching block 1622, the snap latches 1626 can extend back to their default position, which in turn causes the feet 1628 to move under the pinching block 1622 and largely prevent the plug 1606 from being removed from the cap 1606 or from decoupling from the cap 1606. This completes assembly of the cable management system 1600 to the pre-fit stage. The pinching block 1622 also acts as a ledge for the feet 1628 of the snap latches 1626 to hook onto and catch on.

A user can then insert the cable management system 1600 into a slot in an accessory rail, with the plug 1606 in the pre-fit stage (i.e., not pushed fully into the cap 1602) such as an M-LOK slot, with the locking members 1604 deflected inward to allow the engaging members 1608 to pass through the slot. One or more cables can be inserted into the cable channels 1650, 1652, 1654, 1656 and the cap 1606 can continue to be pressed into the slot until it bottoms out on the accessory rail and the cables are completely surrounded by the cable channels 1650, 1652, 1654, 1656 on three sides and the accessory rail on the fourth side. Once the engaging members 1608 clear sidewalls of the slot, the locking members 1604 will pivot outward to their default positions causing the engaging members 1608 to be position under the sidewalls of the slot thereby creating a first resistance to removal of the cable management system from the slot. In other words, the locking members 1608 can form a snap fit coupling with the M-LOK slot.

The user can then slide the cable management system 1600 along the slot to another location (i.e., until a selected location is achieved) (e.g., cable slop can be taken up), at which point, the user pressed down on the plug 1606 causing the tapered region 1607 to press outward on the locking members 1604. The force of this outward pressure secures the cable management system 1600 in position in the slot. The cable channels 1650, 1652, 1654, 1656 can be sized to create a slight pinch on the cable(s) either top to bottom, side-to-side, or both. For instance, the pinching block 1622 can extend into the first and second cable channels 1650, 1652 sufficiently to squeeze a cable side-to-side (see first cable channel 150 in FIG. 2 for an example of this side-to-side pinching).

Figure 15:
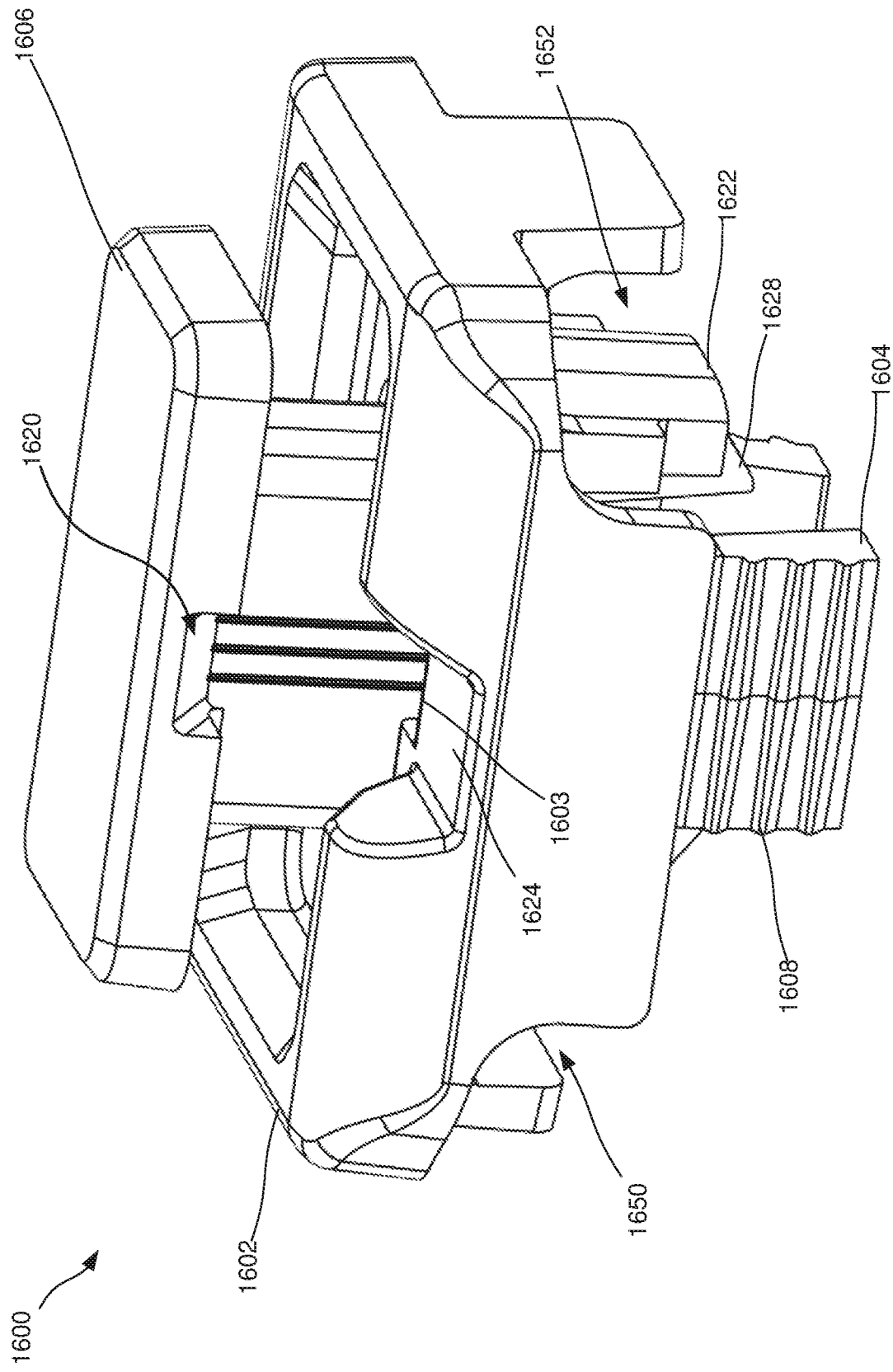
FIG. 15 illustrates an alternative embodiment of a cable management system where the plug includes snap latches and feet enabling two positions for the plug in the cap.
Figure 16:
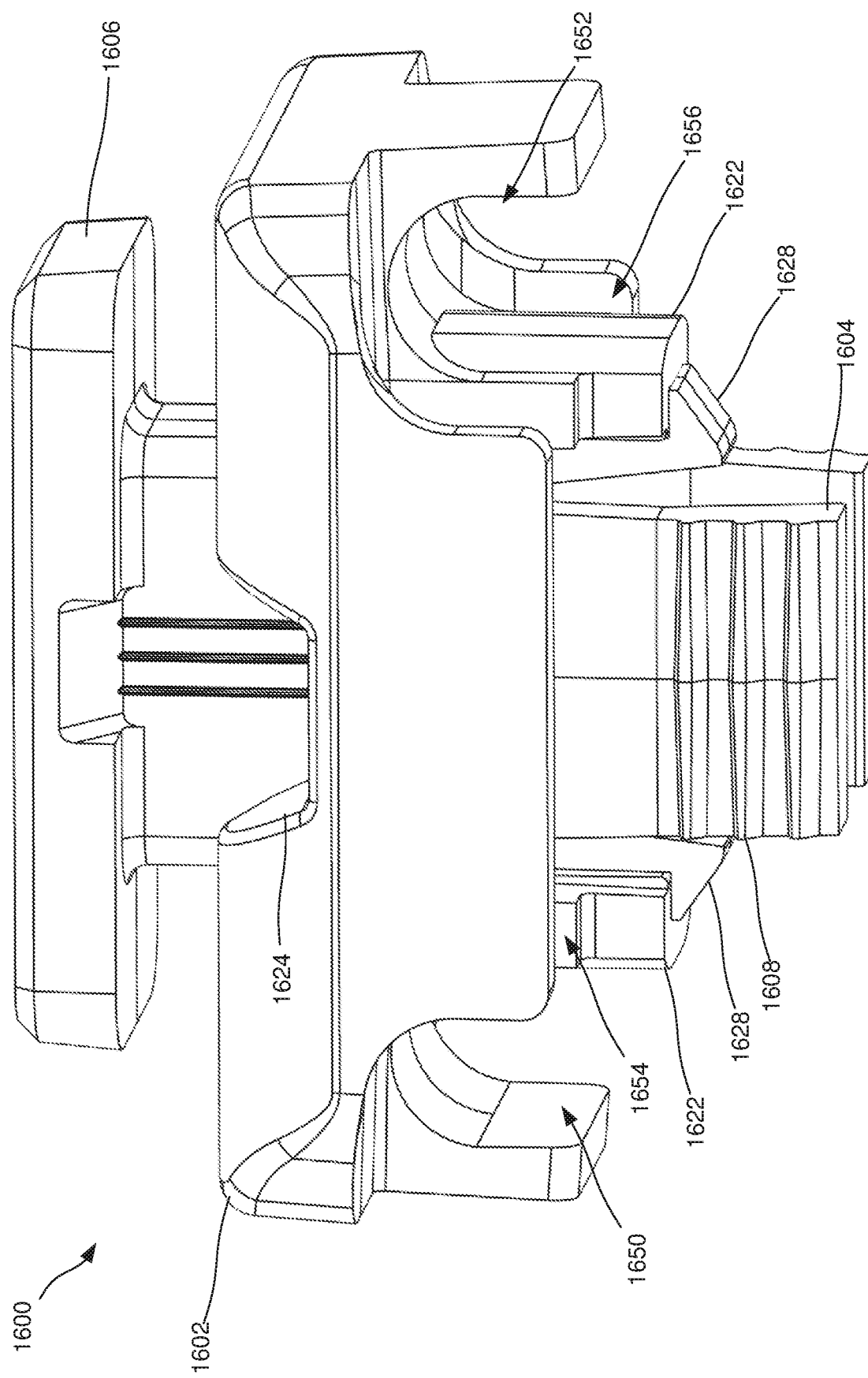
FIG. 16 illustrates another view of the alternative embodiment of FIG. 15.
Figure 17:
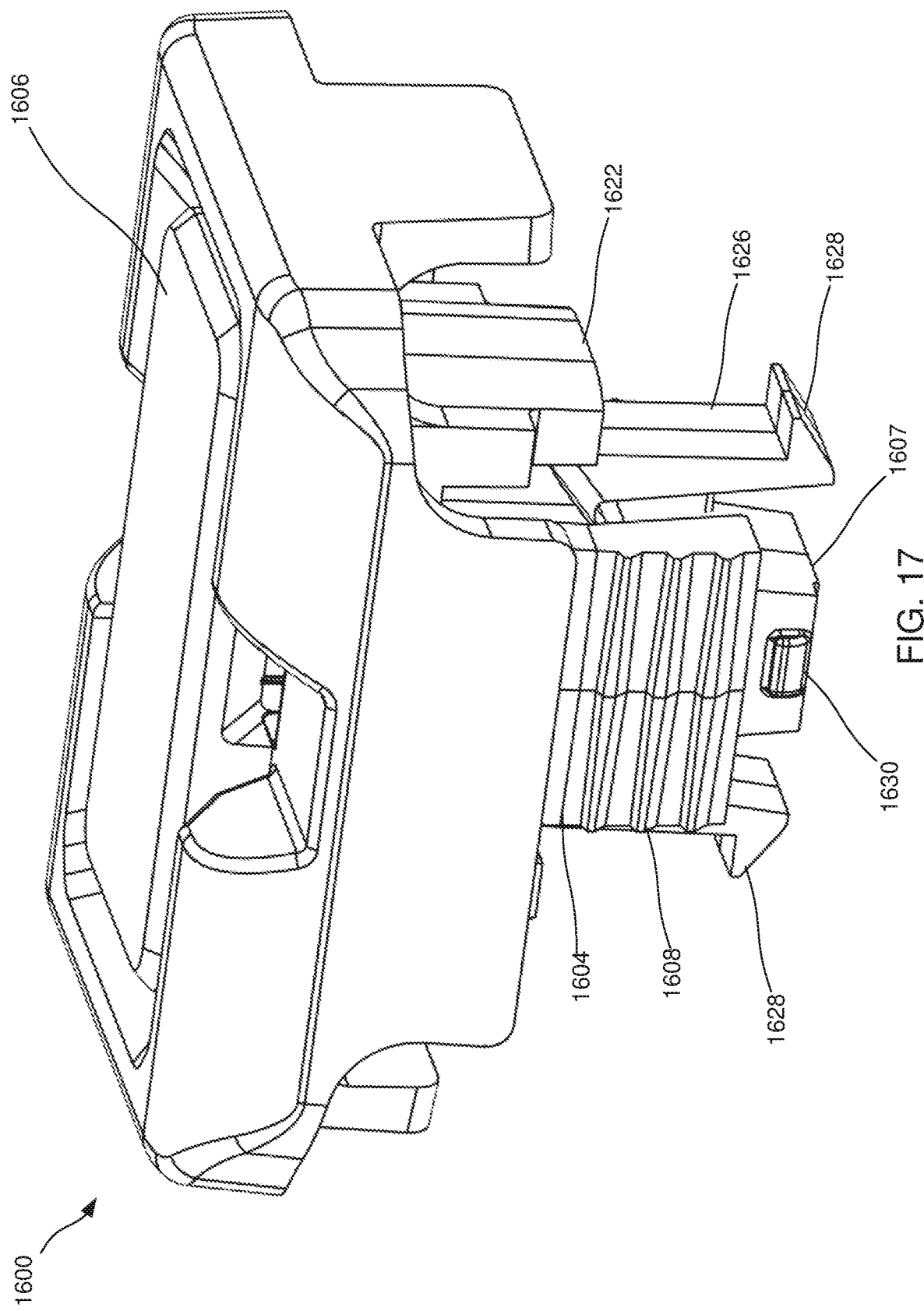
FIG. 17 illustrates another view of the alternative embodiment of FIG. 15, but with the plug fully inserted.
Figure 18:
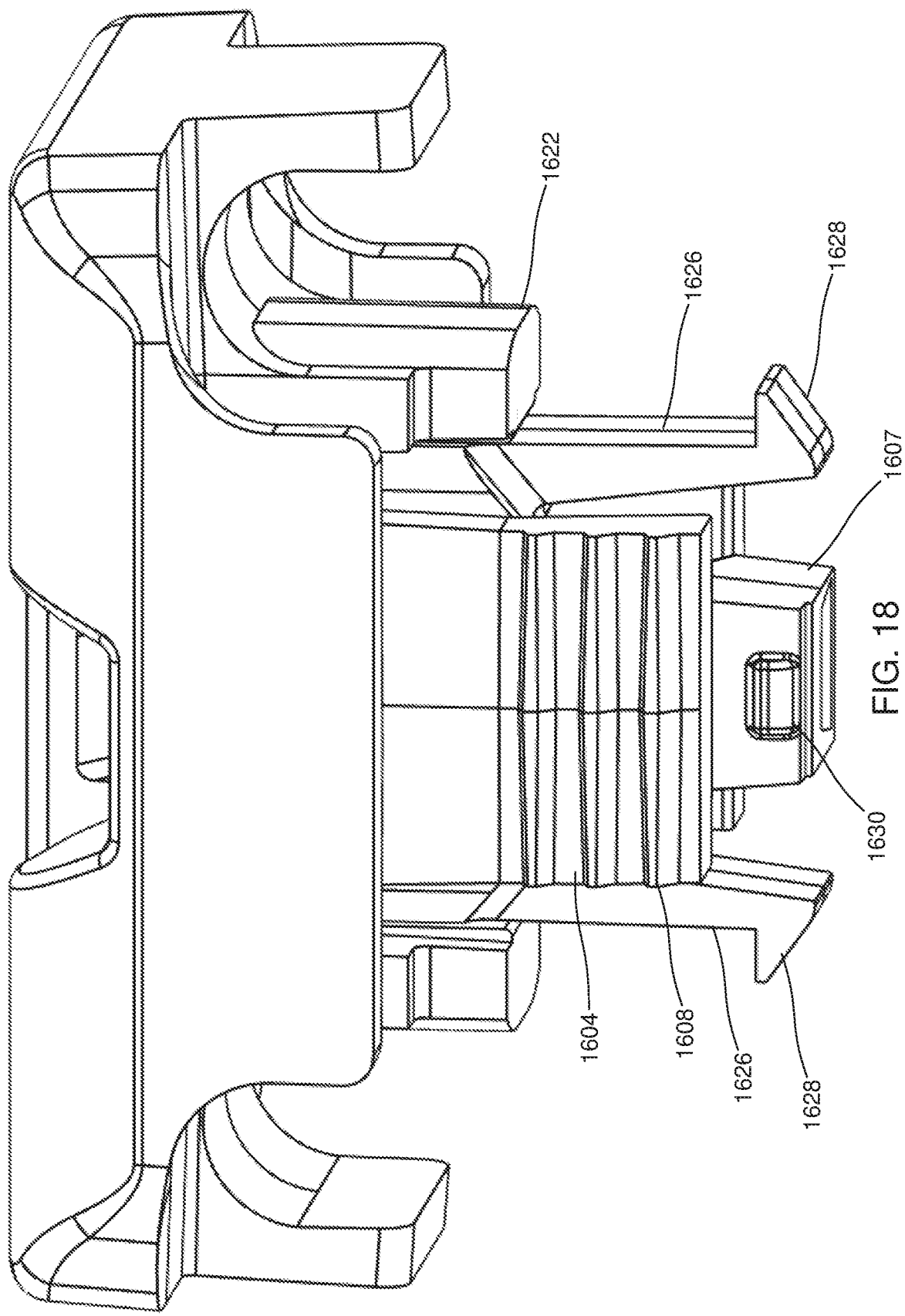
FIG. 18 illustrates another view of the embodiment see in FIG. 17.

To adjust a position of a cable, or to remove a cable, the plug 1606 is levered upward. A tool or object, such as the end of a bullet, can be inserted into one of the two removal apertures 1620 to pry the plug 1606 upward. Once the plug 1606 is back into the pre-fit stage as seen in FIGS. 15 and 16, the cable management system 1600 can slide along the slot for repositioning, raised above the accessory rail sufficiently to allow a cable to be removed from one of the cable channels 1650, 1652, 1654, 1656, or removed entirely from the slot. If the cable management system 1600 is not immediately recoupled to the accessory rail, it can be stored with little risk of the cap 1602 and plug 1606 becoming separated as the feet 1628 make it fairly difficult to inadvertently separate the two.

The nub 1630 fits into a notch (not visible) on the inside of either of the locking members 1604 to help hold the plug 1606 up in the pre-fit state. The nub 1630 is shallow enough that pushing it past the notches on the locking members 1604 does not take much effort. Further, when the plug 1606 is fully inserted, the nub 1630 acts as a stop when contacting a bottom of the locking members 1604 to prevent the plug 1606 from working its way backwards and out of the fully-inserted position.

Figure 21:
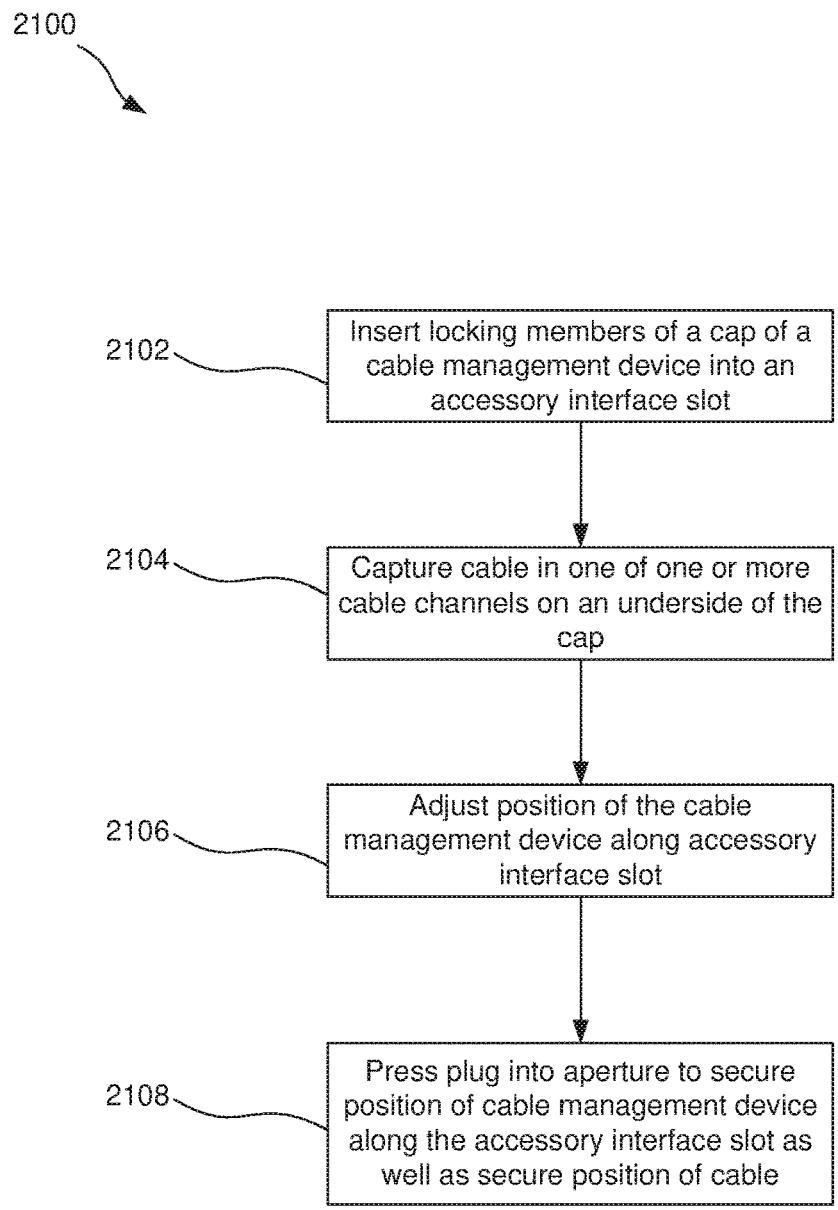
FIG. 21 is a flowchart of an example method for routing cables using a cable management system.

FIG. 21 is a flowchart of an example method for routing cables using a cable management system. At step 2102, a user inserts locking members of a cap of a cable management device into an accessory interface slot. In some embodiments, this can be done independently from the plug (e.g., see FIGS. 1-11), while in others, the plug stays with the cap even before the cap is engaged with the accessory interface slot (e.g., see FIGS. 15-18). At step 2104, the user captures a cable in one of one or more cable channels on an underside of the cap. For instance, the cable can be snap fit into the channel, which can occur before or after the cap is first inserted into the accessory interface slot. If the cap is inserted into the slot first, then some gap should be left between the bottom of the cap and the accessory to give room for the cable to be snapped into one of the channels. Once the cable is captured, the cap can be fully inserted into the slot such that the locking members snap below the slot thereby providing a first level of resistance to removing the cap from the slot. At step 2106, the users can adjust a position of the cable management device along the accessory interface slot. Once a desired location is selected, at step 2108, the user presses a plug into the aperture to secure the position of the cable management device along the accessory interface slot as well as a position of the cable along the accessory interface slot. This step 2108 may merely involve pressing the plug all the way into the aperture where the plug starts in a pre-fit state.

While generally described in relation to firearms and firearm handguards, it should be noted that the cable management system 100 described herein may be utilized for securing or affixing other items besides firearm accessories and may engage with other surfaces of a firearm such as a mounting rail on a firearm's receiver or fore-end stock, for example. Additionally, the disclosed cable management system 100 can be used to secure cables, cords, and straps for scientific, photographic, computer, phone, consumer products, business products, and musical equipment, to name a few non-limiting examples. Further, the cap 102 and/or plug 106 depicted in FIGS. 1-14 and the cap 1602 and plug 1606 depicted in FIGS. 15-19, may be utilized with other cable management assemblies, besides the cable management system 100.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A cable management system comprising:
    a cable management device comprising:
        a means for removably coupling the cable management device to a slot;
        two or more cable channels on a bottom of the cable management device, wherein two of the two or more cable channels intersect;
        an aperture; and
        a first plug slidingly engaged in the aperture, wherein full insertion of the first plug into the aperture causes the means for removably coupling the cable management device to the slot to secure the cable management device in a location along the slot; and
    a first cable secured within one of the two or more cable channels when the first plug is fully inserted into the aperture.

2. The cable management system of claim 1, wherein the first plug comprises two snap latches configured to prevent the first plug from decoupling from the cable management device when the cable management device is not inserted in the slot or while in a pre-fit state.

3. The cable management system of claim 2, wherein the first plug further comprises a nub near a bottom that, via contact with one of two locking members of the cable management device, prevents the first plug from inadvertently being removed from the cable management device while in a fully-inserted state.

4. The cable management system of claim 1, wherein the means for removably coupling the cable management device to the slot comprises two locking members configured to deflect inward when the cable management device is inserted into the slot, and to return to a default position once engaging members of the two locking members clear the slot.

5. The cable management system of claim 4, wherein a tapered region of the first plug is shaped to press the two locking members outward and enhance securement of the cable management system at a selected location along the slot.

6. The cable management system of claim 1, wherein the slot is a part of a firearm.

7. The cable management system of claim 6, wherein the slot is a part of a forend of the firearm.

8. The cable management system of claim 1, wherein the means for removably coupling the cable management device to the slot comprises two locking members extending down from a bottom of the cable management device and configured to snap fit into the slot.

9. The cable management system of claim 1, further comprising a second plug arranged adjacent to the first plug.

10. The cable management system of claim 9, wherein the means for removably coupling the cable management device to the slot comprises four locking members.

11. The cable management system of claim 1, wherein the two or more cable channels comprise a first pair of cable channels and a second pair of cable channels, and wherein the first pair of cable channels intersect the second pair of cable channels.

12. A device comprising:
    a cap comprising:
        an aperture;
        at least two cable channels open on a bottom of the cap to accept one or more cables, wherein two of the at least two cable channels intersect; and
        two locking members forming sides of the aperture and extending below a bottom of the at least two cable channels, the two locking members configured to couple to an object via a slot in the object; and
    a plug removably engaged in the aperture and configured to press the two locking members against sides of the slot and prevent inadvertent removal of the device from the slot when the plug is fully inserted into the aperture thereby securing the device at a selected position along the slot.

13. The device of claim 12, wherein the plug comprises two snap latches that prevent the plug from inadvertently being removed from the cap while in a pre-fit state.

14. The device of claim 13, wherein the plug further comprises a nub near a bottom of the plug that, via contact with one of the two locking members of the cap, prevents the plug from inadvertently being removed from the cap while the cap is in a fully-inserted state.

15. The device of claim 12, further comprising two locking members forming a part of the aperture, wherein the two locking members are configured to deflect inward when the cap is inserted into the slot, and to return to a default position once engaging members of the two locking members clear the slot.

16. The device of claim 15, wherein a tapered region of the plug is shaped to press the two locking members outward and enhance securement of the device to the object.

17. A method of routing cables comprising:
    inserting locking members of a cap of a cable management system into an accessory interface slot;
    capturing a cable in one of one or more cable channels on an underside of the cap, wherein two of the one or more cable channels intersect;

adjusting a position of the cable management system along the accessory interface slot; and pressing a plug into an aperture in the cap to secure the position of the cable management system along the accessory interface slot as well as a position of the cable along the accessory interface slot.

18. The method of claim 17, further comprising partially removing the plug from the aperture in the cap and sliding the cable management system to another location on the accessory interface slot.

19. The method of claim 17, further comprising after removing the plug to at least a pre-fit state, moving the cable management system along the accessory interface slot or removing the cable management system to remove the cable from the one or more cable channels.

* * * * *